Jan. 14, 1958 T. F. SCHLICKSUPP 2,819,691
WAFFLE BAKING MACHINE
Filed Sept. 29, 1953 4 Sheets-Sheet 1

INVENTOR
THEODORE F. SCHLICKSUPP
BY
Pennie, Edmonds, Morton, Barrows and Taylor
HIS ATTORNEYS Jan. 14, 1958 — T. F. SCHLICKSUPP — 2,819,691
WAFFLE BAKING MACHINE
Filed Sept. 29, 1953 — 4 Sheets-Sheet 2

INVENTOR
THEODORE F. SCHLICKSUPP
BY Pennie, Edmonds, Morton, Barrows & Taylor
HIS ATTORNEYS Jan. 14, 1958  T. F. SCHLICKSUPP  2,819,691
WAFFLE BAKING MACHINE
Filed Sept. 29, 1953  4 Sheets-Sheet 3
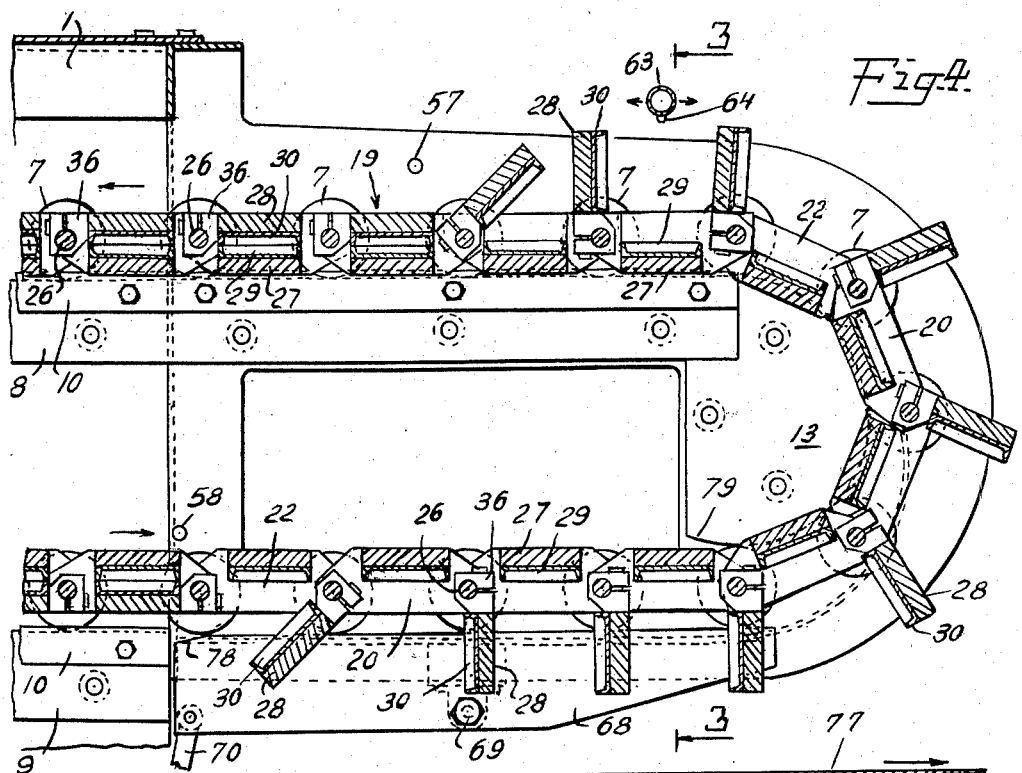
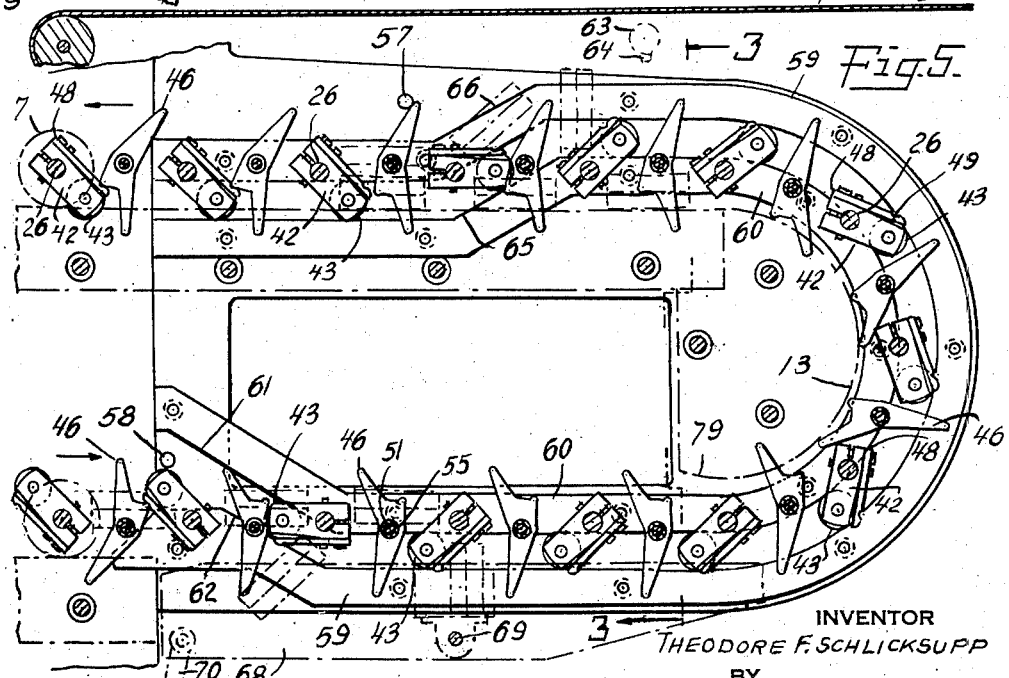
INVENTOR
THEODORE F. SCHLICKSUPP
BY
Pennie, Edmonds, Morton, Barrows and Taylor
HIS ATTORNEYS Jan. 14, 1958     T. F. SCHLICKSUPP     2,819,691
WAFFLE BAKING MACHINE
Filed Sept. 29, 1953     4 Sheets-Sheet 4
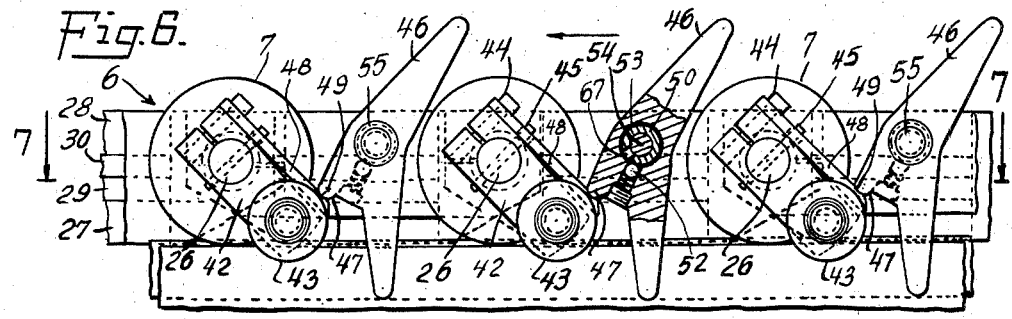
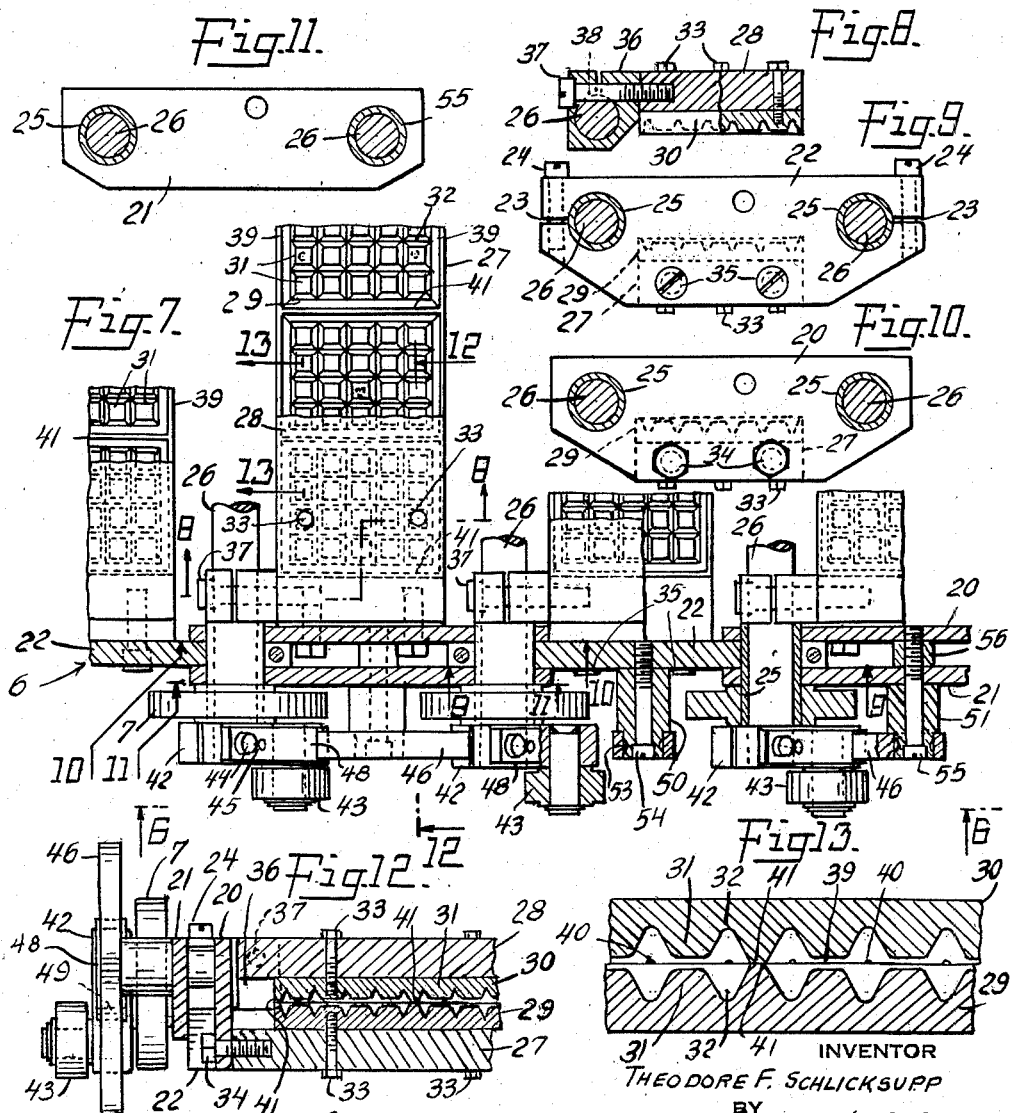

United States Patent Office 2,819,691
Patented Jan. 14, 1958

2,819,691

WAFFLE BAKING MACHINE

Theodore F. Schlicksupp, Long Island City, N. Y.

Application September 29, 1953, Serial No. 382,952

13 Claims. (Cl. 107—58)

This invention relates to improvements in machines for baking waffles.

In marketing waffles it is customary to supply them to bakeries, food stores and the like, baked and frozen. The waffles are completely baked, that is to say, baked until they are "done," and then quickly frozen. The waffles thus prepared are stored frozen and then, at the time of their consumption, are thawed, warmed in any convenient manner, as for example in a household baking oven, and served. Waffles as ordinarily made and which are not stored frozen quickly become stale, that is within a few days their flavor becomes seriously impaired.

The purpose of the present invention is, therefore, also to provide an apparatus for baking waffles by means of which the freezing and frozen storage steps are eliminated and yet the waffles will retain their flavor for a considerable length of time, i. e. sufficiently long for the marketing of the waffles in the ordinary way.

With conventional waffle baking apparatus, the waffles are baked in groups of individual waffles in such a way that the batter overflows the edges of the individual waffle baking molds, and this excess must be trimmed away after baking, in some cases requiring the waffles to be cut apart, in order to have the waffles of uniform size for marketing.

An object of the invention is to provide an apparatus in which, although the waffles are baked in groups, they are maintained at all times separate from one another, thereby eliminating the servered edges which admit air to the interior of the waffle causing it to become stale quickly.

Another object of the invention is to provide a waffle baking apparatus which eliminates the necessity of trimming the waffle edges or cutting apart of the waffles.

Another object of the present invention is to provide an apparatus by means of which the individual waffles are formed with a continuous skin or crust which extends throughout the entire surface of the waffle including the edges.

Another object of the invention is to provide a waffle baking apparatus by means of which the usual wastage of batter is eliminated.

A further object of the invention is to provide an apparatus for producing waffles that are only partially baked, but to a sufficient extent so that the completion of the baking operation can be successfully accomplished in an ordinary bread toaster.

The apparatus of the invention will be understood from the following detail description thereof in connection with the accompanying drawings which show, by way of example, one form of the waffle baking apparatus.

In these drawings:

Fig. 4 is an enlarged vertical section taken on line 4—4 of Figs. 2 and 3;

Fig. 5 is a similar view drawn to the same scale, the section being taken on line 5—5 of Figs. 2 and 3;

Fig. 6 is a still more enlarged fragmentary vertical section taken on line 6—6 of Figs. 2 and 7;

Fig. 7 is a horizontal section drawn to the same scale as Fig. 6 and taken approximately on line 7—7 of that figure, that is, at various levels;

Figs. 8–11 are detail vertical sections taken on the various lines indicated in Fig. 7;

Fig. 12 is a vertical section taken on line 12—12 of Fig. 7 and drawn to the same scale; and Fig. 13 is a fragmentary vertical section taken on line 13—13 of Fig. 7 and drawn to a still larger scale.

Figure 1:
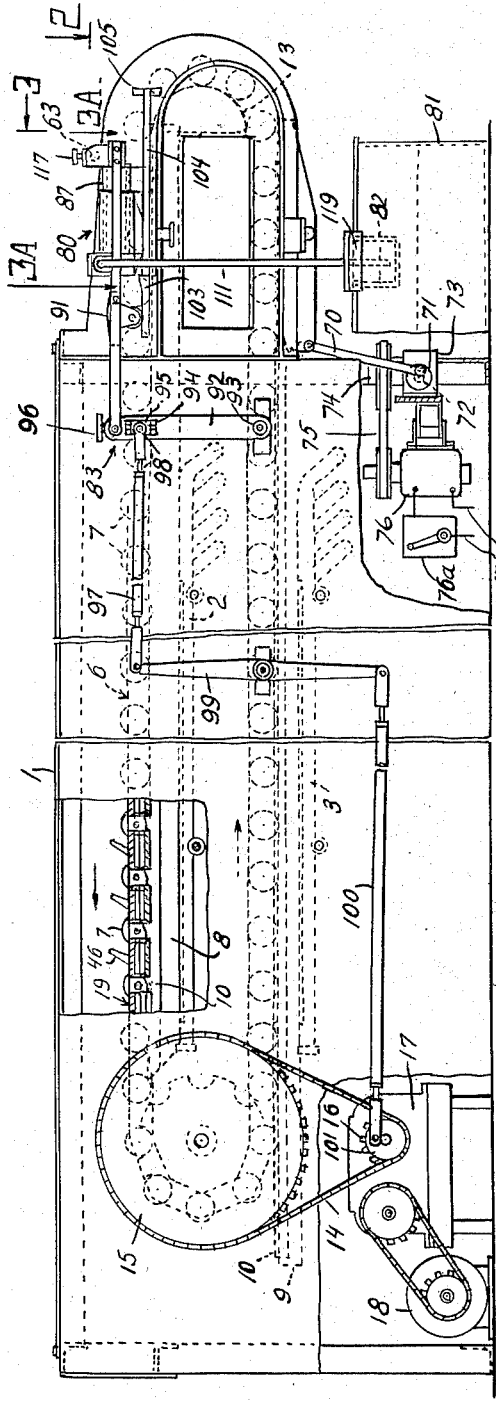
Fig. 1 is a view of the waffle baking machine in side elevation, with certain parts of the casing broken away and with a portion of the interior mechanism shown in vertical section.
Figure 2:
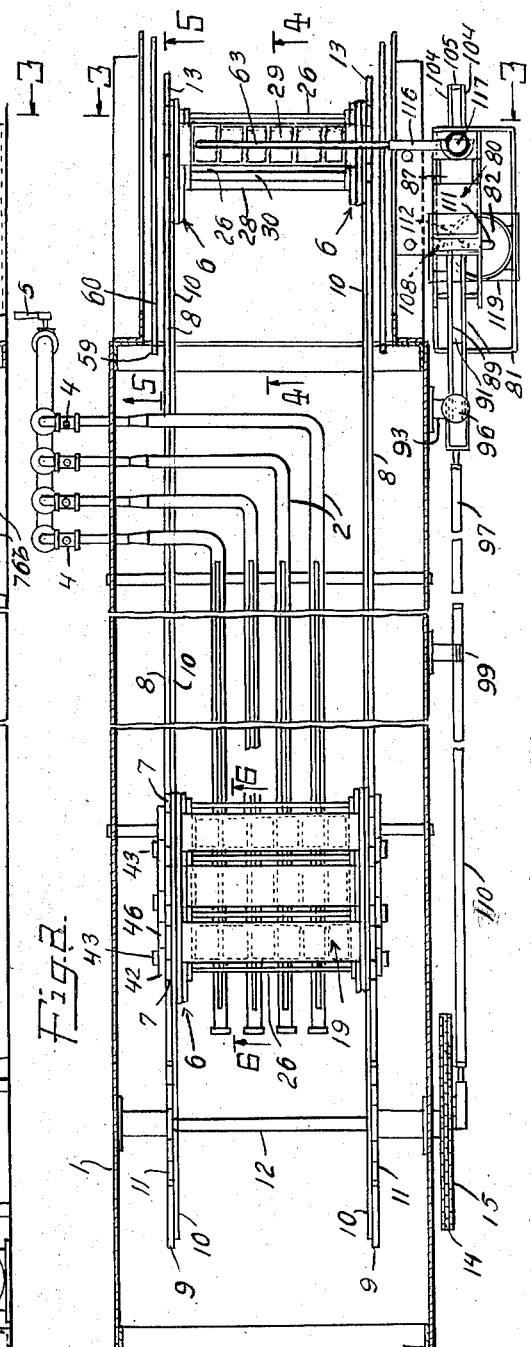
Fig. 2 is a horizontal section taken on broken line 2—2 of Fig. 1.

The invention relates to machines of the type wherein waffle irons or molds, sometimes referred to as "books," travel in an endless series past a station where the waffle irons are opened and filled with batter, than through a baking oven and back to the filling station where the waffle irons are reopened and the baked waffles discharged therefrom prior to their being refilled with batter.

Referring to the drawings, the baking oven comprises an elongated chamber with in a suitable casing or housing 1 which is closed on all sides and at the left end. Within this casing suitable heating burners 2 and 3 are provided, together with conventional regulating valves 4 and a cut-off valve 5. Arranged within the casing is a pair of endless chains indicated generally by reference numeral 6. These chains are supported on rollers or wheels 7 which run on pairs of upper and lower flanged rails 8 and 9. The flanges are provided by means of narrow metal strips 10 which are bolted to the insides of the rails and serve to maintain the wheels 7 on the rails. The upper rails 8 extend to the right beyond the open right end of the casing for a purpose which will be explained later.

The endless chains 6 travel from right to left on the upper rails 8 and from left to right on the lower rails 9 and are driven by a pair of sprockets 11 mounted on a shaft 12 near the left hand end of casing 1. At the right end of their travel the rollers or wheels 7 supporting chains 6 travel around the edges of a pair of semi-circular stationary plates 13. Driving shaft 12 for the sprockets 11 is driven by means of a chain 14 which is trained around a large sprocket 15 keyed to shaft 12, and around a small sprocket 16 which is mounted on the output shaft of a speed-reducing mechanism 17. The input shaft of this mechanism is belt driven from a driving motor 18.

The endless chains 6 carry the endless series of waffle irons or molds which, as previously mentioned, are constructed as book-like devices. Each book-like device extends between the two chains 6 and carries a plurality, in this instance six, of individual waffle molds or mold cavities. The device is made with hinged sections so that by swinging these sections open the entire six molds can be easily emptied of the baked waffles, refilled with batter and reclosed to again travel through the baking oven. These book-like waffle iron devices are illustrated in detail in relation to one of the endless supporting chains 6 in Fig. 7 and its related figures. These are also shown, some in closed and some in open position, in Fig. 4 where they are indicated generally by reference numeral 19.

Fig. 7 also shows in detail the construction of the endless chains 6. These comprise a series of double links inter-connected by single links. Each pair of double links comprises an inside link 20 and an outside link 21, the inside link being wider or deeper than the outside link, as may be seen by comparing Figs. 10 and 11. The reason for this will appear presently. The single links 22 are somewhat thicker than the links 20 and 21 and are slotted at each end as shown at 23 in Fig. 9. This forms a clamp at each end of the single links 22, having a tightening screw 24.

The purpose of these clamps is to secure or fix to the single or center links 22 at each end a short sleeve 25. These sleeves have a three-fold purpose. They serve as the inter-connecting pivots between the single links 22 and their adjacent double links 20 and 21 at each end. They serve as bearings for the chain supporting wheels 7, which roll on the track rails 8. They also serve as bearings for cross rods 26 which rigidly inter-connect the two chains 6 throughout their lengths, and which also support one of the hinged waffle mold sections, as will presently appear.

Figure 3:
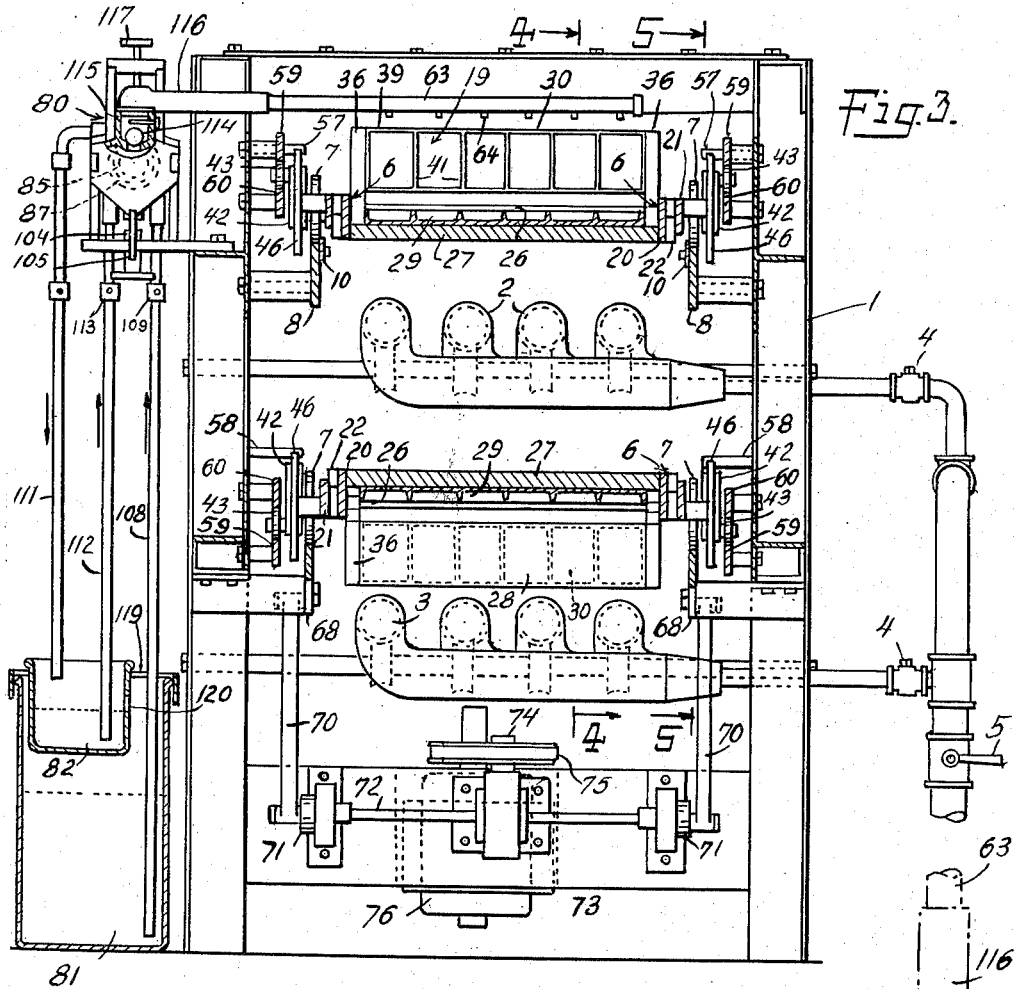
Fig. 3 is a vertical section taken on line 3—3 of Figs. 1, 2, 4 and 5.

Each of the book-like mold devices 19 comprises lower and upper (referring to Figs. 7 and 12) fixed steel backing plates 27 and 28. These plates are rectangular in shape and extend between the chains 6 (Fig. 3). These plates carry on their inner surfaces cast aluminum waffle grids 29 and 30. The surfaces of these grids which come together as shown in Figs. 12 and 13, and also in Fig. 4, when the waffle irons are closed, are molded to give them the usual waffle pattern; that is to say, the surfaces of plates 29 and 30 are formed with rows of square blocks 31 (Fig. 7), with valleys 32 between them. The waffle grids 29 and 30 are secured to the steel backing plates 27 and 28 respectively, by means of a series of screws 33 (Fig. 8).

Alternate lower backing plates 27 are mounted between the inner vertical surfaces of the inside double links 20, and the intermediate lower backing plates 27 between the single or center links 22, so that the plates which are supported by these links are somewhat longer than those which are supported by the double links. In Fig. 12 one end of a lower backing plate 27 may be seen secured in position on one of the inside double links 20, this being accomplished by means of a pair of screws 34. (See also Fig. 10.) The mounting of these lower backing plates on the single links 22 is similar, the heads of the attaching screws 35 being shown in Figs. 7 and 9.

The upper backing plates 28 are secured, one to each of the cross rods 26. This is done by means of a pair of combination bracket and clamp members 36 (Fig. 8). One of these members 36 is secured adjacent to each end of each of the plates 28 by means of a combined clamping and attaching screw 37. This screw serves both to clamp the bracket member 36 to its supporting rod 26, and also to secure the side edge of a plate 28 to the bracket. In order to firmly lock or key the parts to rod 26, the sides of rod 26 are grooved as indicated at 38 for the passage of the attachment screws 37.

In accordance with the present invention it is important to have the individual waffle molds or cavities filled to the proper and predetermined extent with batter. Accordingly, it is important that each of these molds have the same batter capacity. Consequently, the waffle grids 29 and 30 are molded and machined with extreme care so that each of the waffle molds will all have the same volume when the grids are brought together by the closing of the hinged supporting plates 27 and 28, which are to be described later on. Thus, not only are all of the individual waffle sections of each of the plates 29 and 30 of a single book carefully machined so that they will be substantially identical, but all of the waffle grids of the entire waffle baking apparatus are so machined.

It is also important, in accordance with the invention, to have the grids 29 and 30 closed tightly together when each of the books is closed, in order to prevent the escape or over-flow of batter. Hence, the meeting surfaces of the two grids 29 and 30 are also machined with an unusual degree of accuracy so that the longitudinal sides 39 of both the upper and lower waffle grids will meet and provide a substantially liquid-tight joint throughout their edges. Extremely small steam escape vents 40 (Fig. 13) are, however, provided. These are minute grooves approximately 1/100 of an inch deep, formed in the edges of the sides 39 of the upper waffle grid 30 opposite or in line with the transverse valleys 32 between the squares 31 of the waffle molds.

It is further important, in accordance with the invention, to prevent the flow of batter between individual waffle molds, and for this reason the individual molds are separated by transverse ribs 41 formed on the respective lower and upper waffle grids 29 and 30 and precisely machined so as to meet and form liquid-tight joints between the individual waffle molds, as may be seen particularly in Fig. 13.

The purpose of making the backing plates 27 and 28 of substantial thickness is not only to make them rigid to aid in bringing about accurate closing of the meeting surfaces of the longitudinal sides 39 and cross ribs 41 of the waffle grids 29 and 30, but also to serve to store heat so as to prevent the waffle grids from cooling too much between the time they leave the baking oven at the discharge station, and the time they reenter the oven after filling. For both of these reasons the inner surfaces of backing plates 27 and 28 are machined to accurate flatness, and the outer surfaces of waffle grids 29 and 30 are also machined to accurate flatness before assembly.

The book-like mold devices are opened and closed, that is to say, the upper backing plates 28 are swung about their hinges, first to open the waffle molds and later to close them, by means of a cam track arrangement at the right end of the oven casing, as shown in detail in Fig. 5, and which will be later described. To cooperate with this cam track mechanism the cross rods 26 are provided at each end with an actuating arm 42 at the lower end of which is an operating roller 43 to co-act with the cam track. Each of these arms is both clamped and pinned to its rod 26 (Fig. 6). The slotted ends of these arms are drawn together by means of clamping screws 44, and the pins are indicated at 45.

The book-like mold devices are locked in closed position by means of three-pronged latching levers 46, one at each side of the chains 6, which are pivoted on the sides of the cross rods 26 intermediate the cross rods 26. Each lever 46 has upper and lower actuating fingers and a short latching nose 47. The nose 47 engages the side of a thick flat or plate spring 48 near its outer end (Fig. 6). These springs 48 are mounted on the upper sides of the actuating arms 42 and held in place by the screws 44 and pins 45. Arms 42 taper slightly in thickness toward their outer ends so as to permit inward movement of the outer portion of each of the springs 48.

The outer face of each spring 48 has a shallow recess 49 to receive the latching nose 47. The location of the pivot for each of the latching levers 46 is such as to place the point of engagement of nose 47 with its cooperating recess 49 substantially in line with the axis of rollers 43 so that the parts will remain in latched position after the latching fingers 46 have been swung to this position, as shown in Fig. 6.

Latching fingers 46 are mounted on collar-type pivot members 50 and 51 (Fig. 7) which are reduced at their outer ends to form on each a bearing surface and shoulder to receive the pivot aperture of a latching member. The latching member is held in place by means of a spring-pressed ball 52 (Fig. 6) operating in a shallow groove 53 in the surface of the reduced position of the collar-type pivot member. Pivot members 50 and 51, which are mounted on the sides of the chain links, are held in place by means of screws 54 and 55. In order to mount all of the latching members 46 at the same lateral distance from the center of endless chain 6, the collar-type pivots 50 which are mounted on the single chain links 22 are somewhat longer than the pivot members 51 which are mounted on the outside links 21 of the double chain links. For reasons of strength the inner ends of the screws 55 are threaded into the inside link 20 and consequently a spacing collar 56 is placed on each of screws 55 between the double links 20 and 21.

In order to actuate the latching levers 46 to lock the waffle mold sections 27 and 28 in closed position, a stationary finger 57 is mounted to project horizontally from the framework of the machine which extends to the right of casing 1, in the path of the upper fingers of the latching members. One of these fingers 57 is arranged on each side of the machine (Fig. 3). Accordingly, after the cam track arrangement of Fig. 5 has actuated the arms 42 to close the sections of a given book-like device 19, the upper portions of each of the two latching members 46 of this device strike the respective pins 57 and swing the latching levers in the clock-wise direction (Fig. 6) so as to move the latching nose 47 of each latch into the recess 49 of the co-acting plate spring 48.

The mold sections are held in closed position in this manner throughout their travel from the right toward the left through the baking oven 1, around the sprocket wheel 11, and thence from the left towards the right until just after they have passed out of the oven after the baking operation has been completed. At this point the opposite actuating fingers of the two locking latches 46 of this book-like mold device strike two stationary releasing pins 58, one on each side of the machine, and actuate the latching members in the counter-clockwise direction, so as to release the locking nose 47 of each latch from the end of the spring 48 so that the mold sections can be rocked to open position by the cam track arrangement of Fig. 5.

This cam track comprises a pair of edgewise mounted bars 59 and 60 which are suitably secured to the framework of the apparatus and supported in spaced relation to permit the movement of the actuating rollers 43 between them. These bars 59 and 60 are shaped at their left-hand lower ends so as to provide inclined or cam surfaces 61 and 62, inclined downwardly toward the right in the direction to cause the opening of the mold sections of the successive devices 19 when the rollers 43 thereof strike the cam surfaces 61, as the devices move out of the oven. At the lower part of Fig. 5 one of the rollers 43 is shown in position between the two cam surfaces 61 and 62. At this point the arm 42 which supports this roller has been swung downwardly to horizontal position, or through an angle of about 45°, and correspondingly the mold section 28, 30 has been opened about half way or to an angle of about 45° from its closed position. The next roller 43 and arm 42 have been moved downwardly through a further angle of 45° thus rotating the mold section 28, 30 to vertical or fully open position.

The arrangement of the bars 59, 60 is such that they maintain the successive book-like mold sections fully open while the sections pass around the end of the machine, the supporting wheels 7 riding on the edges of the semi-circular plates 13, and until the mold sections have passed the filling spout 63 from which the 6 individual waffle molds in each book-like device 19 receive fresh charges of batter. As shown in Fig. 3 the batter pipe 63 is provided with a spout 64 over each of these 6 waffle molds. Somewhat after the waffle mold books pass the filling pipe 63 the rollers 43 engage another pair of cam surfaces 65 and 66 which are sloped downwardly in a direction to reclose the hinged sections of the waffle books 19. Thereupon the latching levers 46 engage the closing pins 57 to lock the mold sections in closed position, and they then re-enter the baking oven 1.

The purpose of the plate springs 48 on the actuating arms 42 and their engagement with the closing nose members 47 of the latching levers, is to maintain the closing edges of the waffle irons 29 and 30 in firmly closed position and under such pressure that they will withstand a predetermined amount of batter pressure without permitting the escape or overflow of batter along the side edges 39 or between the separating edges 41. Any normal amount of vapor or steam generated within the molds during baking is permitted to escape through the small vents 40. Should, however, there be an unusually sudden generation of steam pressure within any of the book-like waffle mold devices, the springs 48 permit a slight separation of the closing edges of the waffle irons 29 and 30 so as to release such excess pressure.

In order to maintain the latching levers 46 in a definite angular position during the period that they are released from the plate springs 48, that is, between the time of the opening of the mold sections and their reclosing, each of the grooves 53 on the pivot members 50 and 51 is provided with a drilled passageway 67 (Fig. 6) into which the spring-pressed ball 52 moves when the latch is moved to release position.

To bring about prompt ejection of the waffles from the waffle molds, when the mold sections are opened by the cam tracks 59 and 60 as above described, a pair of pivoted and oscillatable track sections 68 are provided (Figs. 3 and 5). These are pivoted at 69 to the framework at the right end of the oven, the pivots being approximately in the center, lengthwise, of the track sections. Rocking motion is applied to these track sections by means of a pair of connecting rods 70 which are pivoted at their upper ends to the inner ends of rocking track sections 68, and attached at their lower ends to a pair of cranks 71 which are fixed to the opposite ends of a rotating shaft 72.

This shaft is driven centrally from a gear reducing box 73, the input shaft 74 of which is connected by an endless belt 75 to the shaft of a driving motor 76. This motor is arranged with a variable speed control device 76a connected in the power supply circuit 76b of the motor, so as to permit variation of the frequency of oscillation or rocking movement of the two rail sections 68. It is desired to free the waffles as quickly as possible after the opening of the waffle mold sections, waffles being received on the surface of a discharge conveyer belt 77. It has been found that at times the waffles have a tendency to adhere to the waffle molds with greater tenacity than other times, and by providing for a variation in the frequency of oscillation of the waffle molds, the most effective frequency can be obtained.

As the supporting wheels 7 of the endless chains 6 which carry the waffle mold sections move continuously it is important to enable these wheels to ride from the stationary tracks 9 onto the left end of the oscillating sections 68 at all positions of oscillation of these sections. Accordingly, the left ends of the rail sections 68 are sloped or cammed as shown at 78 in order to provide for smooth transition of the wheels from one rail section to the other. Similar transition of the wheels 7 from the right ends of the pivoted rail sections 68 is provided by means of sloping or cam portions 79 on the leading edges of the arcuate plates 13.

The individual waffle molds for the individual waffles have been described above as having, with some degree of precision, the same volume throughout the machine. To the end of charging each of these molds uniformly with the same quantity of batter a special batter depositing system has been devised. This is illustrated in Figs. 1, 3, 3A and 3B. This system includes a double cylinder batter pump 80, a batter tank 81, a constant level batter reservoir 82 and a pump driving mechanism including a volume regulating device 83 and a quickly operable pump drive disconnecting mechanism 84.

The double cylinder batter pump 80 comprises a fixed hollow cylindrical member 85 (Fig. 3a) which is attached at its left end to the fixed casing 86 of the pump, and an annular plunger 87 which slides in the annular space between members 85 and 86. Plunger 87 projects to the left from a movable discharge casing 88 at its right end which is reciprocated by means of a pair of connecting rods 89, one on each side, these rods being interconnected at their forward or left end by a cross rod 90. Cross rod 90 is engaged by a hook member 91 having a slot in its under side, and this hook member is pivoted at its left end to the upper end of the regulating device 83 which consists of an arm 92 pivoted at 93 at its lower end and provided with a slot 94 in which a pivot block 95 is adjustably positioned. The position of this block may be varied by turning a hand screw 96 to change the length of stroke and, consequently, the amount of batter deposited in the individual waffle molds.

A connecting rod 97 is pivoted at 98 to pivot block 95 and pivots at its opposite end on a direction-reversing centrally pivoted lever 99. Pivoted at the lower end of this lever is a connecting rod 100 which is actuated by a crank pin 101 arranged on the side of sprocket 16 which is mounted on the output shaft of speed reducer 17.

In order to quickly disconnect the pump and stop its operation in the case of an emergency, the forward or right end of hook member 91 is arranged to be supported on a roller 102 which travels back and forth on a cam block 103 having a raised cam portion at its right end. This cam block is mounted on a horizontally movable pair of rods 104 at the right end of which there is a handle 105. When cam block 103 is in its extreme right position as shown in Fig. 3B, the hook member 91 is allowed to engage the cross pin 90 and the reciprocation of the pump continues by means of the crank 101 in timed relation to the movement of the successive open book waffle molds 19 beneath the filling spout pipe 63.

Figure 3B:
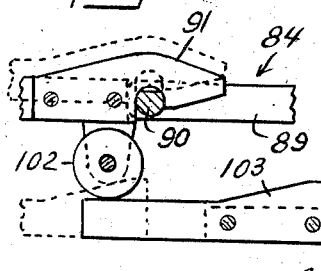
Fig. 3B shows a detail of the batter pump drive mechanism.
Figure 3A:
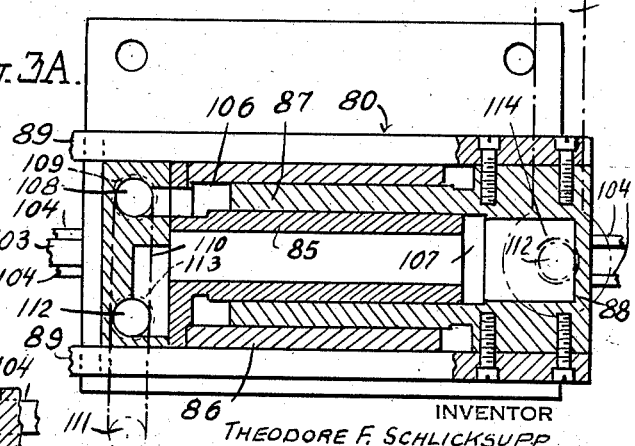
Fig. 3A is a view of the batter pump partly in horizontal section and partly in plan, the section being taken on line 3A—3A of Fig. 1.

When however the handle 105 is moved inwardly so as to place cam block 103 in the dotted position of Fig. 3B, the engagement of roller 102 with the sloping ringht end of the cam block raises the hook member out of engagement with cross pin 90 at each stroke, and prevents operation of the pump.

Referring further to the construction of the pump, the annular cylinder 106 at the inner end of the annular plunger 87 is for the purpose of transferring batter from the batter tank 81 to the constant level batter reservoir 82, and the inner pump chamber 107 takes batter from reservoir 82 to supply it to the distributing pipe 63.

Upon a pump stroke to the right the batter is drawn up through a pipe 108 and past a ball valve 109 at the upper end of this pipe into the annular pump chamber 106. On the next stroke to the left the batter in chamber 106 is forced outwardly above ball valve 109 and through a lateral passage 110 in the pump chamber to outlet pipe 111 and into the constant level reservoir 82. On the next stroke of the pump to the right batter is drawn up into intake pipe 112 from reservoir 82 and past a second ball valve 113 located at the top of this pipe and thence into the second pump chamber 107. On the next pump stroke to the left batter from this chamber is forced upwardly past a third ball valve 114 in the upper part of the right end of casing 88 (Fig. 3A) and into a connection head 115 and thence into the batter distributing pipe 63, from which it is distributed to the six mold chambers of the particular book device 19 which is beneath pipe 63.

The passage of batter from tank 81 through the successive pump chambers has been traced in the previous paragraph. It will be understood, however, that, at each right hand stroke of the movable pump casing 88, batter will be drawn into the pump chamber 106 from tank 81 and simultaneously forced out of pump chamber 107 into the distributing pipe 63.

The pump casing supports or carries the distributing pipe 63, and this pipe thus moves back and forth with the reciprocation of the pump. The timing of the stroking of the pump by the crank 101 (Fig. 1) in relation to the motion of the book-like mold devices 19 beneath the distributing pipe 63 is such that the distributing spouts 64 are maintained substantially centrally over the continuously moving lower waffle grid 29 of this book device. This causes the batter to distribute evenly throughout the surfaces of the six individual waffle mold sections of this grid. During the back stroke of the pump the distributing pipe 63 is carried back towards the right (Fig. 4) ready to commence another distributing stroke, and also during this back stroke the filled book-like device 19 passes from beneath the spouts 64 and the succeeding book device 19 advances beneath the spouts. On the back stroke of the pump suction is applied to the ball valve 114 which holds this valve on its seat and prevents the dripping of batter from the spouts 64 while the new set of book devices 19 is coming into position beneath the filling spouts.

The pump construction described and illustrated is so made as to be easily taken apart for cleaning purposes. To this end the discharge or distributing pipe 63 is removably attached at its left end (Fig. 3) to the head 115 by a joint 116 having ground surfaces and a clamping screw 117. After this pipe has been removed the entire movable casing 88 and plunger 87 can be removed from the remainder of the pump by moving it to the right after disconnecting the hook driving member 91. All three of the batter pipes 108, 111 and 112 are provided with couplings 118 of a type which may be easily disconnected, and the upper sections of these pipes may be unscrewed in order to remove the two ball valves 109 and 113. Furthermore, the constant level reservoir 82 is supported by means of a saddle 119 on the upper edge of the batter tank 81 so that this reservoir can be easily removed.

The purpose of providing the constant level reservoir 82 and double cylinder pump is to avoid variation in the suction required to draw the batter from the main tank 81 into the pump which would occur as the level of the batter descended from near the top of tank 81 to near the bottom. This would be sufficient to change the quantity of batter discharged into the individual molds by an undesired amount, from the standpoint of the present invention. It will be understood that the reservoir 82 receives and holds only approximately the amount of batter required for one charge for filling the 6 waffle molds of each book. Therefore, the batter distributing cylinder 107 will always operate under constant intake head or suction.

While ordinarily approximately the same amount of batter will be transferred to the reservoir 82 at each stroke of the pump, it may be desirable to have the chamber 106 somewhat larger than the chamber 107 so as to always pump a surplus of batter into reservoir 82. In this case an overflow opening such as indicated at 120 in the side of reservoir 82 is necessary.

The waffle baking machine of the present invention provides for the baking of waffles of substantially precisely uniform content, each of the individual batter molds being of the same capacity and receiving identical charges of batter at each filling. The batter molds are thus filled at each filling operation with the correct amount of batter to completely fill the molds during the baking operation, and without excess. Provision is made for the escape of steam or vapors which are formed during the baking operation, without permitting the overflow of batter through the edges of the individual molds, that is, thus from one individual mold to another of the same book, or from the outside edges of the books themselves. Not only wastage of batter, but which is more important, the usual trimming operation together with the work of cutting the waffles apart is eliminated. This enables the waffles to be baked with a continuous crust or skin, which during a trimming operation would be broken, thus causing the waffles to become stale quickly. By preventing the entrance of air to the interior of the waffles through the elimination of the necessity for trimming, the waffles made by the present apparatus can be partially baked if desired, and marketed to be finished at home, as for example, in a toaster.

It will be understood that changes can be made in the construction and arrangement of the improved apparatus without departing from the scope of the invention which is set forth in the appended claims.

I claim:

1. In a waffle baking machine having an endless conveyer comprising a plurality of book-like mold devices each having two hinged mold sections forming a waffle mold when closed, a latching lever to hold said sections closed, said conveyer being arranged to travel past a filling device to supply batter to the opened mold devices and through a baking oven to a waffle discharge point and back to the filling device, means at said discharge point for releasing said latching levers and for opening said hinged mold sections, means for reclosing said mold sections after they pass the filling device, means for actuating said latching levers to lock said reclosed mold sections, one of said mold sections of each of said mold devices being fixedly mounted on a crosswise pivot member of the conveyer, an actuating arm fixed to said pivot member for opening and closing said sections, and a spring fixed on said arm, said latching lever being pivoted on said conveyer and having a portion to engage said spring to hold the mold sections in closed position, so as to permit excessive fluid pressure within the mold devices to partially open said hinged mold sections against the force of said spring to relieve said excess fluid pressure.

2. A waffle baking machine as set forth in claim 1 in which each of said book-like mold devices includes a plurality of waffle molds disposed side by side across the width of the conveyer, and wherein the crosswise extending pivot member is in the form of a rod having one of the mold sections of each of said mold devices fixedly mounted thereon.

3. A waffle baking machine as set forth in claim 2 wherein the rod extends at both ends beyond the mold device, and each end of the rod has fixedly mounted thereon an actuating arm and plate spring.

4. A waffle baking machine as claimed in claim 1 in which said spring comprises a plate spring mounted on the actuating arm having a recess near its free end, and the latching lever has a nose which is movable into and out of said recess to lock and unlock the hinged mold sections.

5. In a waffle baking machine, an endless conveyer comprising a plurality of book-like mold devices having mold sections hinged together and operable from open to closed position to form waffle molds, means for continuously moving said endless conveyer past a batter depositing pipe and through a baking oven to a discharge point and back to the depositing pipe, means for opening said mold sections to receive the batter from said pipe, a batter pump having relatively reciprocating parts including first and second pumping chambers and plungers therein, a batter supply tank connected to said first pumping chamber, and a constant level batter reservoir connected to both of said chambers, said first pump chamber, on each stroke of the pump, transferring a quantity of batter to said constant level reservoir, and said second pump chamber simultaneously transferring approximately the same quantity of batter from said reservoir to said depositing pipe, and mechanism for driving said pump in timed relation to the advance of said conveyer to deposit batter in the successive mold sections.

6. A waffle baking machine as claimed in claim 5 in which the pump is provided with variable-stroke driving means for the relatively reciprocating parts thereof to control the quantity of batter deposited in the waffle mold sections.

7. A waffle baking machine as claimed in claim 5 in which one of the relatively reciprocating parts is fixed and the other movable and wherein the depositing pipe is mounted on the said movable part of the pump and moves with the continuously moving waffle mold section to deposit the batter substantially at the central portion thereof.

8. In a waffle baking machine, an endless conveyer comprising a plurality of book-like mold devices having mold sections hinged together and operable from open to closed position to form waffle molds, means for moving said endless conveyer past a filling device to supply batter to the opened mold devices and through a baking oven to a discharge point and back to the filling device, at said discharge point a pair of rail sections pivoted for vertically oscillating movement, said rail sections supporting said conveyer, means at said discharge point for opening said hniged mold sections, and means for imparting vertically oscillating movement to said rail sections to facilitate the discharge of the waffles from said waffle molds.

9. In a waffle baking machine, an endless conveyer comprising a plurality of book-like mold devices having mold sections hinged together and operable from open to closed position to form waffle molds, means for moving said endless conveyer past a filling device to supply batter to the opened mold devices and through a baking oven to a discharge point and back to the filling device, at said discharge point a pair of rail sections pivoted for vertically oscillating movement, said rail sections supporting said conveyer, means at said discharge point for opening said hinged mold sections, means for imparting vertically oscillating movement to said rail sections to facilitate the discharge of the waffles from said waffle molds, and means for varying the frequency of said movement.

10. In a waffle baking machine, an endless conveyer comprising a plurality of book-like mold devices having mold sections hinged together and operable from open to closed position to form waffle molds, means for moving said endless conveyer past a filling device to supply batter to the opened mold devices, and through a baking oven to a discharge point and back to the filling device, upper and lower track rails within said oven to support said endless conveyer, means at one end of said oven for guiding the conveyer from said lower rails to the upper rails, said guiding means including at said discharge point a pair of rail sections pivoted for vertically oscillating movement, said rail sections supporting said conveyer, means at said discharge point for opening said hinged mold sections, and means for imparting vertically oscillating movement to said rail sections to facilitate the discharge of the waffles from said waffle molds.

11. In a waffle baking machine, a pair of endless chains arranged to travel in parallel horizontally spaced relation, each chain having double links aligned with the double links of the other chain to provide pairs of aligned double links, and each double link comprising parallel rigid inside and outside plate members and interconnected by single links each consisting of a rigid plate member, the ends of said double and single links overlapping one another, alternate lower rigid backing plates each supporting a waffle grid and attached at their ends to the inner faces of the inside plates of each pair of double links, intermediate lower rigid backing plates each supporting a waffle grid and attached at their ends to the inner faces of the rigid plates forming the single links of said chains, upper rigid backing plates carrying waffle grids to cooperate with said lower backing plates and their grids to form waffle molds, means for hinging said upper backing plates to said chains, means for moving said endless chains past a filling device to supply batter to the opened mold devices and through a baking oven to a discharge point and back to the filling device, actuating means carried by said chains for swinging the upper hinged backing plates from open to closed position wtih respect ot said lower backing plates, cam means to coact with said actuating means to swing said hinged backing plates to closed position after leaving the filling device, and cam means for swinging said hinged plates to open position at said discharge point.

12. In a waffle baking machine, a pair of endless chains arranged to travel in parallel horizontally spaced relation, each chain having double links aligned with the double links of the other chain to provide pairs of aligned double links, and each double link comprising parallel rigid inside and outside plate members and interconnected by single links each consisting of a rigid plate member, alternate lower rigid backing plates each supporting a waffle grid and attached at their ends to the inner faces of the inside plates of each pair of double links, intemediate lower backing plates each supporting a waffle grid, and attached at their ends to the inner face of the rigid plates forming the single links of said chain, upper rigid backing plates carrying waffle grids to cooperate with said lower backing plates and their grids to form waffle molds, means for hinging said upper backing plates to said chains comprising a pivot rod for each of said upper backing plates extending between and pivotally mounted on said chains, said upper backing plate being fixed to said rod, an actuating arm fixed to said rod for swinging said backing plate from open to closed position relative to its companion lower backing plate and grid, means for moving said endless chains past a filling device to supply batter to the opened mold devices and through a baking oven to a discharge point and back to the filling device, cam means to coact with said actuating arm to swing said upper backing plates to closed position after leaving the filling device, and cam means coacting with said actuating arm for swinging said plates to open position at said discharge point.

13. A waffle baking machine as claimed in claim 12 in which the pivot rod for each upper backing plate is pivoted within a sleeve, one of said sleeves being fixed within an aperture at each end of the single links of said chains, and the double links of the chains being pivoted to the outer surfaces of said sleeves.

References Cited in the file of this patent

UNITED STATES PATENTS

| | | |
|---|---|---|
| 1,203,108 | Garrison | Oct. 31, 1916 |
| 1,303,128 | Takahashi | May 6, 1919 |
| 1,875,482 | Nanna | Sept. 6, 1932 |
| 2,170,170 | Weil | Aug. 22, 1939 |
| 2,340,354 | Wells | Feb. 1, 1944 |
| 2,549,531 | Schlicksupp | Apr. 17, 1951 |
| 2,621,616 | Ames | Dec. 16, 1952 |
| 2,624,297 | Nuttall | Jan. 6, 1953 |